Jan. 14, 1958   S. R. HOWARD   2,819,788
MATERIAL FEEDING DEVICE
Filed Nov. 23, 1954   4 Sheets-Sheet 1

INVENTOR.
Stanley R. Howard
BY
J. Stanley Churchill
ATTORNEY

Jan. 14, 1958 S. R. HOWARD 2,819,788
MATERIAL FEEDING DEVICE
Filed Nov. 23, 1954 4 Sheets-Sheet 2

INVENTOR.
Stanley R. Howard
BY
J. Stanley Churchill.
ATTORNEY

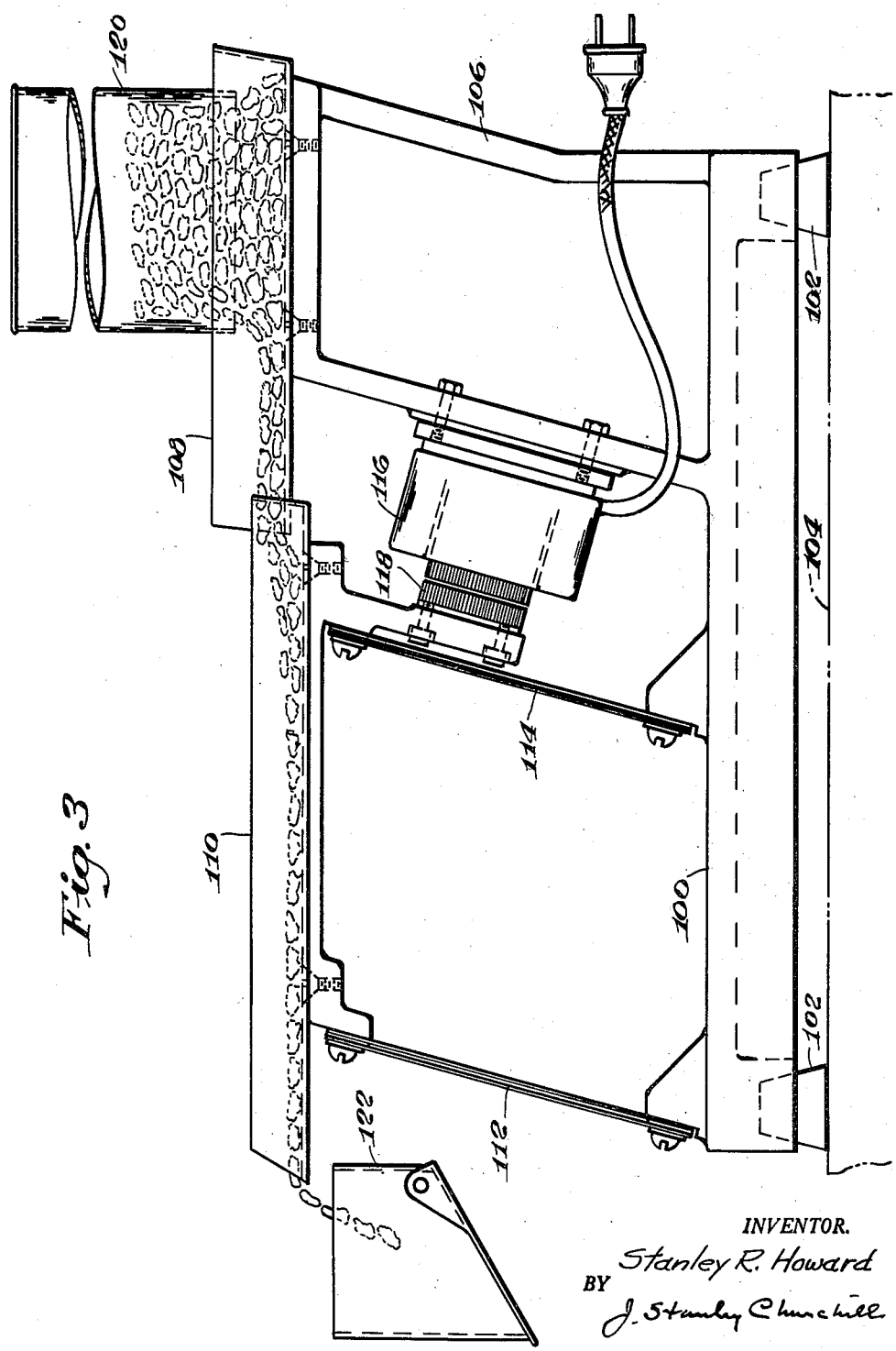

Jan. 14, 1958 S. R. HOWARD 2,819,788
MATERIAL FEEDING DEVICE
Filed Nov. 23, 1954 4 Sheets-Sheet 4
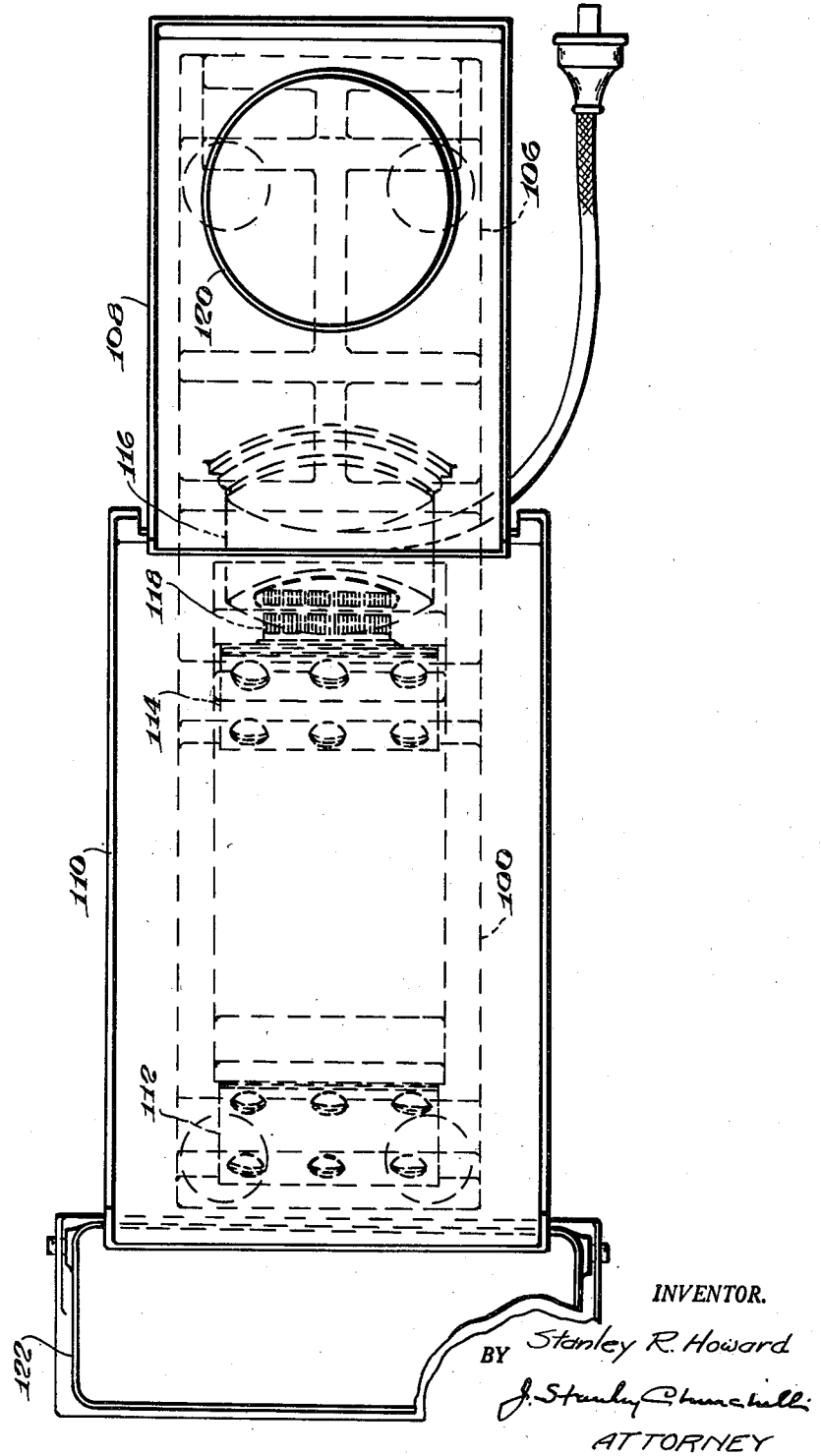
INVENTOR.
BY Stanley R. Howard
ATTORNEY United States Patent Office 2,819,788
Patented Jan. 14, 1958

2,819,788

MATERIAL FEEDING DEVICE

Stanley R. Howard, Milton, Mass., assignor to Pneumatic Scale Corporation, Limited, Quincy, Mass., a corporation of Massachusetts Application November 23, 1954, Serial No. 470,572

8 Claims. (Cl. 198—220)

This invention relates to a material feeding device.

The invention has for an object to provide a novel and improved material feeding device particularly adapted for handling coarse materials having relatively large and irregularly shaped particles in a manner such as to form a relatively thin and uniform stream thereof.

With this general object in view and such others as may hereinafter appear the invention consists in the material feeding device hereinafter described and particularly defined in the claims at the end of this specification.

In the drawings illustrating the preferred embodiment of the invention:

Fig. 3 is a side elevation of a modified form of the present feeding device; and Fig. 4 is a plan view of the feeding device shown in Fig. 3.

Figure 1:
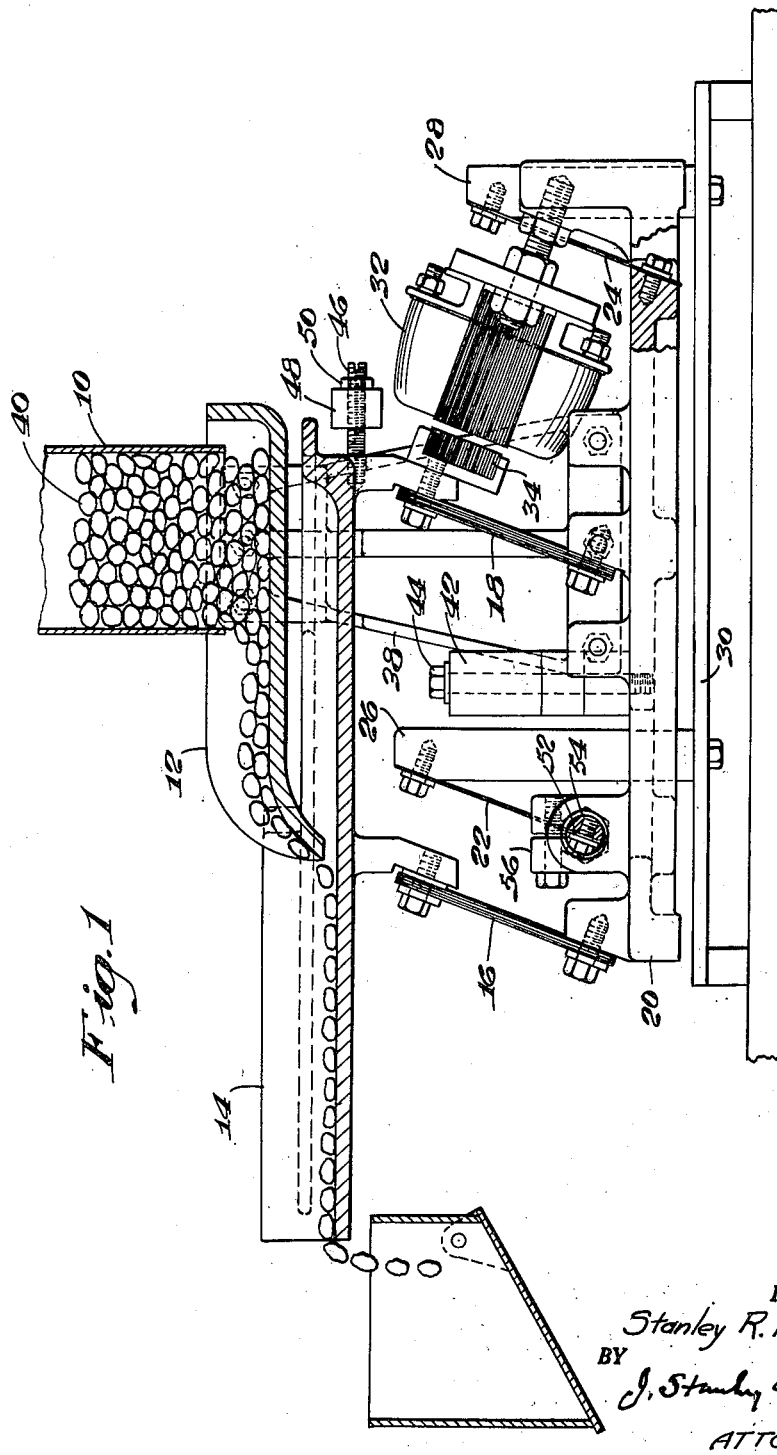
Fig. 1 is a side elevation partly in cross section of one embodiment of the present material feeding device.
Figure 2:
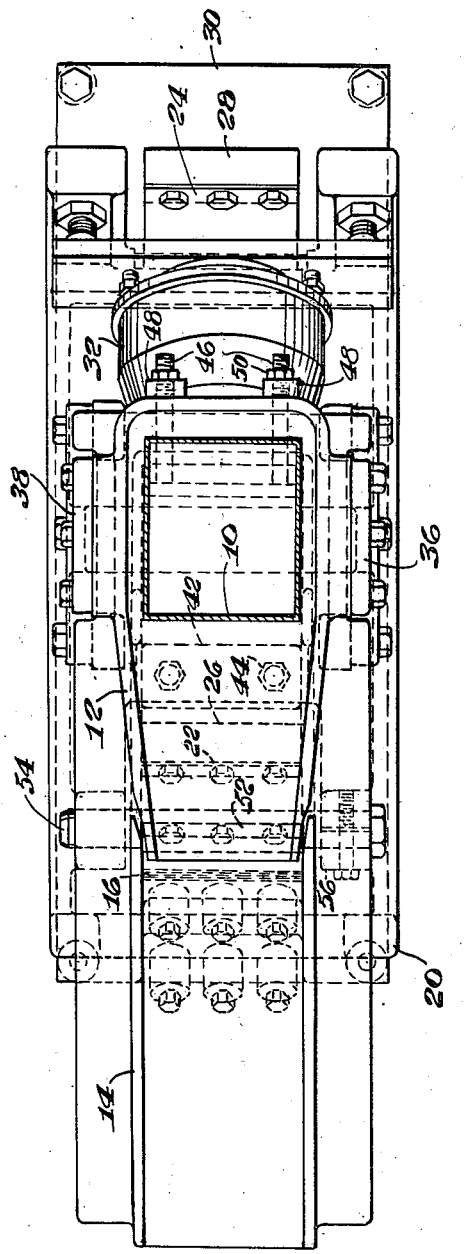
Fig. 2 is a plan view of the feeding device shown in Fig. 1.

In general the present invention contemplates a material feeding device which may be used with advantage in a weighing machine for feeding a substantially uniform stream of material to a weighing receptacle, and which is particularly adapted for efficiently feeding relatively coarse materials having irregularly shaped and relatively large particles, such as crackers, pretzels and the like, which have a tendency to intermesh or become tangled and which have heretofore been difficult to feed in a thin stream with any substantial degree of uniformity of flow.

The illustrated material feeding device includes a substantially horizontally disposed vibratory feed trough or conveyer arranged to receive the material by gravity from a source of supply through a supply conduit from which the material is delivered to one end of the horizontal vibratory trough. In operation the vibration of the horizontal trough effects shearing of the material from the bottom of the supply column to advance the material along the conveyer to be delivered in a substantially uniform stream from the discharge end of the vibratory conveyer.

In practice in feeding devices of this general type the depth of the stream thus formed may normally be controlled by adjustment of the vertical conduit to increase or decrease the distance or space between the mouth of the conduit and the bottom of the vibratory conveyer, a small spacing providing a relatively thin or light stream and a larger spacing providing a relatively thick or heavy stream. Such adjustment to control the height or thickness of the stream is determined by the amount of material required or handled by the weighing machine in a predetermined time, a relatively thin stream advanced at a relatively fast rate being conducive to more accurate weighing performance than a heavy stream advanced at a relatively slow rate. However, in the feeding of material composed of relatively large and irregularly shaped particles, when it was attempted to reduce the rate of withdrawal from the vertical supply conduit by adjustment of the conduit to decrease the space between the mouth of the conduit and the bottom of the conveyer it was found that the relatively large particles could not readily escape from the conduit so that the feeding operation would be terminated or would effect spasmodic release of the material so as to produce a non-uniform stream. Conversely, when the conduit was adjusted relative to the conveyer to permit a greater amount of the material to be withdrawn at a substantially uniform rate the stream was found to be too thick or heavy so that more material than required was delivered to the weighing machine.

In accordance with the present invention a relatively thick or heavy stream is arranged to be uniformly withdrawn from the vertical conduit by a vibratory conveyer arranged to advance the material at a relatively slow rate, and provision is made for delivering such a stream onto a second vibratory conveyer arranged to advance the material at a relatively faster rate whereby to form a thinned out, substantially uniform stream in the second conveyer to be delivered into a weighing receptacle or other container at a rate and in an amount consonant with the speed and amount of material required by the weighing machine for most efficient operation.

In the illustrated embodiment of the invention the second or lower vibratory conveyer is arranged to be vibrated by an electrically operated vibratory motor mounted on a base member, the motor cooperating with an armature carried by the second conveyer which may be supported by leaf springs from the base member. The first or upper conveyer is directly supported by brackets extended from the base member and is arranged to receive its vibrations from the base member. In practice the base member and its attached upper conveyer is of substantially greater mass than the lower conveyer so that in operation most of the energy of the motor will be used to vibrate the lower conveyer at a relatively large amplitude to effect a relatively fast rate of flow of the material, and some of the energy of the motor will be transmitted through the relatively heavier base member to the upper conveyer to effect vibration thereof at a relatively smaller amplitude and consequently to effect a relatively slower rate of flow of the material. In one embodiment of the invention the base member itself may be suspended by relatively rigid flexible metal cantilever spring straps from uprights fixed in a solid base member or machine frame whereby to assist in transmitting the vibratory movement from the base member to the upper conveyer, and provision is also made for varying the relative weights of the base member and the lower conveyer and for biasing one of the flexible spring straps to modify the relative vibratory movement of the upper and lower conveyers.

Referring now to the drawings, the present material feeding device may be embodied in an automatic weighing machine of the type illustrated and described in the United States patent to Stanley R. Howard, No. 2,151,107, dated March 21, 1939, to which reference may be had and which is adapted to handle, weigh and package flowable solid material in a rapid and accurate manner. In the illustrated embodiment of the invention the material to be packaged may be delivered by gravity from a storage hopper or other supply through a vertically disposed conduit 10 onto one end of a horizontally disposed vibratory material feeding conveyer 12. In practice the vertical supply conduit 10 may be adjusted vertically relative to the horizontally disposed feed conveyer 12 for varying the distance from the lower end or mouth of the conduit to the bottom of the conveyer to vary the amount or flow of material withdrawn from the conduit 10, a large spacing feeding a relatively large amount of material to form a relatively deep or thick stream of material advanced in the conveyer, and a smaller spacing decreasing the rate of withdrawal to form a relatively shallow or thin stream in the conveyer.

The material feeding conveyer 12 is arranged to be vibrated to effect a relatively slow rate of feed through connections from the base, as will be hereinafter described, and as herein shown, the material is fed forwardly along the conveyer 12 and off the discharge end thereof to fall by gravity onto a second or lower horizontally disposed feed conveyer 14 which is arranged to be vibrated to effect a relatively faster rate of feed. The lower conveyer 14 comprises an elongated trough or chute supported intermediate its ends by angularly arranged thin flexible leaf springs 16, 18 connected to a base member 20 which is itself supported by angularly arranged and relatively rigid flexible metal cantilever spring straps 22, 24 secured at their upper ends to the tops of vertical posts 26, 28 upstanding from and secured to a fixed supporting plate 30 attached to the machine frame. The lower conveyer 14 may be vibrated by an electrically operated vibratory motor 32 attached to the suspended base member 20, and arranged to cooperate with an armature 34 secured to the conveyer 14.

As herein illustrated, the upper conveyer 12 is arranged to be vibrated through connections from the suspended base member 20 in a manner such that the vibratory impulses of the base are transmitted through the base to the upper conveyer attached thereto. As herein shown, the upper conveyer 12 is rigidly connected to the base member 20 by side frame brackets 36, 38 bolted to the base member and to the sides of the upper conveyer.

From the description thus far it will be seen that in the operation of the material feeding device the material 40 to be fed, which may comprise relatively large and irregularly shaped particles, is supported in a vertical column in the supply conduit 10, and the lower end of the conduit may be spaced relative to the bottom of the upper conveyer 12 so as to permit a free and substantially uniform withdrawal of material from the mouth of the supply conduit onto the conveyer 12 during the vibratory movement. Since the suspended base member 20 and its attached conveyer 12 are of much greater mass than the lower conveyer 14, and preferably at least twice as heavy, the amplitude of vibration of the upper conveyer 12 will be substantially less than the amplitude of vibration of the lower conveyer, and as a result thereof the relatively thick or heavy stream of material withdrawn from the supply conduit is advanced at a relatively slow rate along the upper conveyer 12. Thereafter, the relatively thick stream of material discharged onto the lower conveyer 14, vibrated at a relatively greater amplitude, is caused to be advanced at a relatively faster rate so as to reduce the volume or depth of the stream and produce a relatively thin and faster moving uniform stream of material to be discharged into the weighing receptacle of the weighing machine. In practice the relative weights of the base member 20 and the material feeding conveyer 14 may be proportioned so as to effect a rate of advance of the material in the conveyer 14 at a speed about twice the speed of the material in the conveyer 12, and in order to modify the relative amplitudes of vibration of the two conveyers the base member 20 may be provided with one or more weights 42 which may be attached thereto by bolts 44, as shown. Likewise, the lower conveyer 14 may be provided with threaded extensions 46 arranged to receive adjustable weights 48 secured thereto by nuts 50.

In operation the connection of the base member 20 by the flexible metal cantilever spring straps 22, 24 permit greater freedom of movement of the base member 20 to transmit the vibrations of the vibratory motor 32 to the upper conveyer 12, and as herein shown, provision is made for adjustably biasing one of the springs 22 in a manner such as to modify the amplitude of vibration of the upper conveyer 12. It will be observed that the angularly disposed relatively rigid cantilever spring straps 22, 24 are preferably disposed substantially parallel to the leaf springs 16, 18 and that the recoil of the base member 20 in a rearward direction, or to the right viewing Fig. 1, after a vibratory impulse of the vibratory motor 32 will load the spring straps 22, 24 and the energy thus stored will effect a forward movement of the base member to return the same to its initial position. As shown in Fig. 1, the forward spring strap 22 is attached at its lower end to a flattened or cutout portion 52 of a shaft 54 mounted to be rotatably adjusted in a clamp bearing 56. One end of the shaft 54 is provided with a hexagonal head to facilitate rotary adjustment, and the shaft is held in its adjusted position by tightening the clamp bearing. Thus, it will be seen that in operation adjustment of the shaft 54 in a clockwise direction will bias the spring strap 22 in a direction to increase the forward movement of the base member, and conversely, adjustment of the shaft in the other direction will bias the spring strap to decrease the forward movement of the base member 20. Also, in practice it was found that by adjustably biasing at least one of the spring straps 22, 24 the direction and rate of advance of the material in the upper conveyer may be controlled.

In a modified form of the invention, illustrated in Figs. 3 and 4, the material feeding device includes a base member 100 supported on resilient legs 102 attached to the frame 104 of the machine. The base member is provided with an upstanding portion 106 to which a horizontally disposed upper vibratory conveyer 108 is attached. The lower horizontally disposed vibratory conveyor 110 is supported from the base member 100 by angularly arranged flexible leaf spring 112, 114 and is arranged to be vibrated by an electrically operated vibratory motor 116 attached to the upstanding portion 106 of the base member and which cooperates with an armature 118 carried by the lower vibratory conveyer.

In the operation of the modified form of material feeding device the material is withdrawn from a vertical supply conduit 120 having the lower end thereof disposed in suitably spaced relation from the bottom of the upper conveyer 108 so as to permit a free and uniform withdrawal of the relatively large and irregularly shaped particles of material onto the upper vibratory conveyer during the vibration thereof to produce a relatively thick or heavy stream of material in the conveyer. The base member 100 is of substantially greater mass and weight than the lower conveyer 110 supported by the leaf springs 112, 114, and the vibration of the upper conveyer 108 is effected by the reaction of the vibratory motor 116 through the base member 100 so as to produce a relatively small amplitude of vibration of the upper conveyer and thus effect a relatively slow advance of the thick stream of material along the upper conveyer. When the thick stream of material reaches the discharge end of the upper conveyer it is permitted to fall by gravity onto the lower conveyer 110 vibrated at a relatively larger amplitude whereby to advance the material at a relatively faster rate to effect thinning out of the stream which may be discharged into a weighing receptacle 122 of a weighing machine. In practice the relative amplitudes of vibration of the two conveyers 108, 110 is preferably such as to effect advance of the material in the lower conveyer 110 at twice the rate of advance of the material in the upper conveyer 108.

From the above description it will be seen that the present material feeding device is capable of producing a relatively thin and fast moving stream of coarse materials having relatively large and irregularly shaped particles by first effecting withdrawal of the material onto a vibratory conveyer having a relatively small amplitude of vibration to form a thick stream, and then discharging the thick stream onto a vibratory conveyer having a relatively larger amplitude of vibration to form a thin stream advanced at a relatively faster rate and which is conducive to more accurate weighing performance when embodied in a weighing machine.

While the preferred embodiment of the invention has been herein illustrated and described it will be understood that the invention may be embodied in other forms within the scope of the following claims.

Having thus described the invention what is claimed is:

1. A material feeding device for coarse materials comprising a horizontal vibratory conveyer adapted to be vibrated to effect a relatively slow conveying action, a supply conduit having its mouth spaced from said conveyer a distance such as to permit a uniform withdrawal of the coarse material by said conveyer forming a relatively thick stream in said conveyer, a second horizontal vibratory conveyer disposed to receive the material discharged from said first conveyer, means for supporting said second conveyer including a relatively heavy base member, flexible means connecting the second conveyer to said base, means for vibrating said base, said vibrating means being mounted on said base and operative to vibrate said second conveyer to effect a relatively large amplitude of vibration of said second conveyer whereby to impart a relatively fast conveying action thereto to form a thin stream of material being conveyed thereby, the reaction impulses of said vibrating means being transmitted to said base to vibrate the same, and a rigid connection between said base and said first conveyer whereby vibration of said relatively heavy base will be transmitted to said first conveyer to effect vibration thereof at a relatively smaller amplitude.

2. A material feeding device for coarse materials comprising a horizontal vibratory conveyer adapted to be vibrated to effect a relatively slow conveying action, a supply conduit having its mouth spaced from said conveyer a distance such as to permit a uniform withdrawal of the coarse material by said conveyer forming a relatively thick stream in said conveyer, a second horizontal vibratory conveyer disposed to receive the material discharged from said first conveyer and vibrated to effect a relatively fast conveying action whereby to form a relatively thin uniform stream of said coarse material, means for supporting said second conveyer including a relatively heavy base member, flexible means connecting the second conveyer to said base, a single electrically operated vibrating motor attached to said base and having an armature attached to said second conveyer arranged to effect a relatively large amplitude of vibration of said flexible connected second conveyer, the reaction impulses of said motor being transmitted to said base to vibrate the same, a rigid connection between said base and said first conveyer whereby vibration of said relatively heavy base will be transmitted to said first conveyer to effect vibration of a relatively smaller amplitude, and weighted members detachably connected to said base member and said second conveyer for varying the relative amplitudes of vibration of said two conveyers.

3. A material feeding device for coarse materials comprising a horizontal vibratory conveyer adapted to be vibrated to effect a relatively slow conveying action, a supply conduit having its mouth spaced from said conveyer a distance such as to permit a withdrawal of the coarse material by said conveyer forming a relatively thick stream in said conveyer, a second horizontal vibratory conveyer disposed to receive the material discharged from said first conveyer and vibrated to effect a relatively fast conveying action whereby to form a relatively thin uniform stream of said coarse material, means for supporting said second conveyer including a relatively heavy base member, flexible means connecting the second conveyer to the said base, a single electrically operated vibrating motor attached to said base and having an armature attached to said second conveyer arranged to effect a relatively large amplitude of vibration of said flexibly connected second conveyer, the reaction impulses of said motor being transmitted to said base to vibrate the same, a rigid connection between said base and said first conveyer whereby vibration of said relatively heavy base will be transmitted to said first conveyer to effect vibration of a relatively smaller amplitude, a frame and flexible means connecting said base to said frame.

4. A material feeding device for coarse materials as defined in claim 3 wherein the flexible means connecting the second conveyer to the base includes leaf springs angularly arranged with respect to the base and the conveyer, and wherein the flexible means connecting the base to the frame includes spring straps arranged substantially parallel to said leaf springs.

5. A material feeding device as defined in claim 4 having means for adjustably biasing one of said spring straps for controlling the conveying action of said first conveyer.

6. A material feeding device for coarse materials comprising a horizontal vibratory conveyer adapted to be vibrated to effect a relatively slow conveying action, a supply conduit having its mouth spaced from said conveyer a distance such as to permit a withdrawal of the coarse material by said conveyer forming a relatively thick stream in said conveyer, a second horizontal vibratory conveyer disposed to receive the material discharged from said first conveyer and vibrated to effect a relatively fast conveying action whereby to form a relatively thin uniform stream of said coarse material, means for supporting said second conveyer including a relatively heavy base member, flexible means connecting the second conveyer to said base, a single electrically operated vibrating motor attached to said base and having an armature attached to said second conveyer arranged to effect a relatively large amplitude of vibration of said flexibly connected second conveyer, the reaction impulses of said motor being transmitted to said base to vibrate the same, and a rigid connection between said base and said first conveyer whereby vibration of said relatively heavy base will be transmitted to said first conveyer to effect vibration of a relatively smaller amplitude, a frame, flexible spring straps connecting the base to said frame, and means for adjustably biasing at least one of said spring straps for modifying the conveying action of said first conveyer.

7. A material feeding device as defined in claim 1 wherein the supply conduit comprises a non-vibratory hopper forming a vertical column of material with the bottom of the column supported on said first conveyer.

8. A material feeding device for coarse materials comprising a frame, a base member flexibly suspended from said frame, a lower conveyer flexibly supported from said base, a single vibrating means mounted on said base arranged to vibrate the lower conveyer at a relatively large amplitude of vibration and through the reaction impulses of said vibrating means to vibrate the base member at a relatively small amplitude of vibration, an upper conveyer regidly secured to said base whereby to receive vibrations transmitted through said base member at a relatively small amplitude of vibration, and a material supply conduit communicating with said upper conveyer whereby to provide a relatively thick and slowly advanced stream of material in said upper conveyer to be discharged into said lower conveyer and advanced in a relatively thin uniform stream of material by said lower conveyer.

References Cited in the file of this patent

UNITED STATES PATENTS

| | | |
|---|---|---|
| 2,266,906 | Rapp | Dec. 23, 1941 |
| 2,337,667 | Kuehlman | Dec. 28, 1943 |